Aug. 13, 1940.    H. DECKARD    2,210,902
FISHING TOOL
Filed June 28, 1938    2 Sheets-Sheet 1
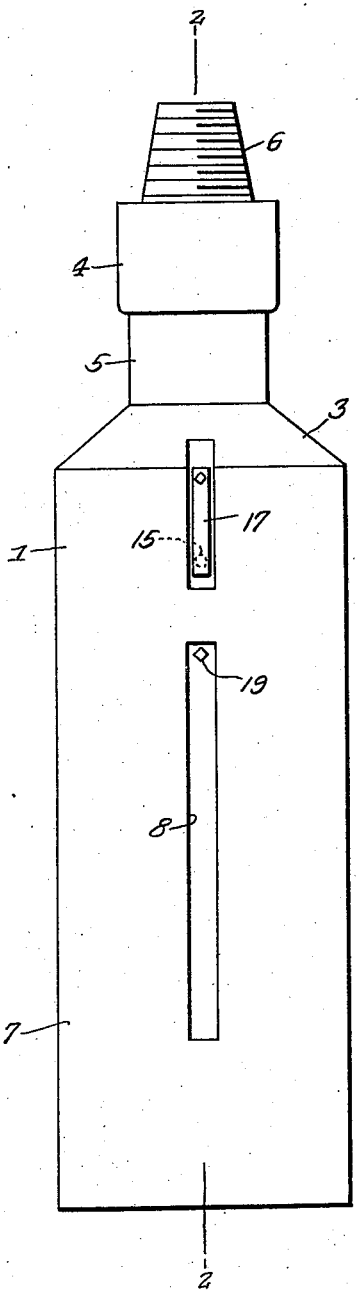
Fig. 1.
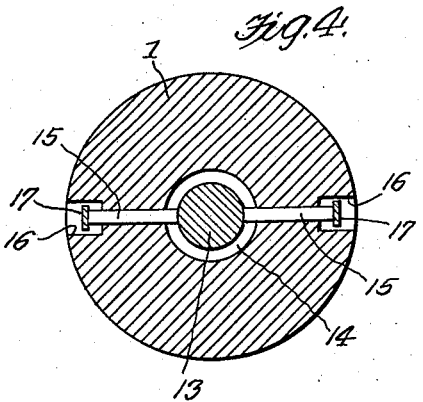
Fig. 3.
Fig. 4.
Inventor
Homer Deckard,
By Clarence A. O'Brien
and Hyman Berman
Attorneys Aug. 13, 1940.  H. DECKARD  2,210,902
FISHING TOOL
Filed June 28, 1938   2 Sheets-Sheet 2
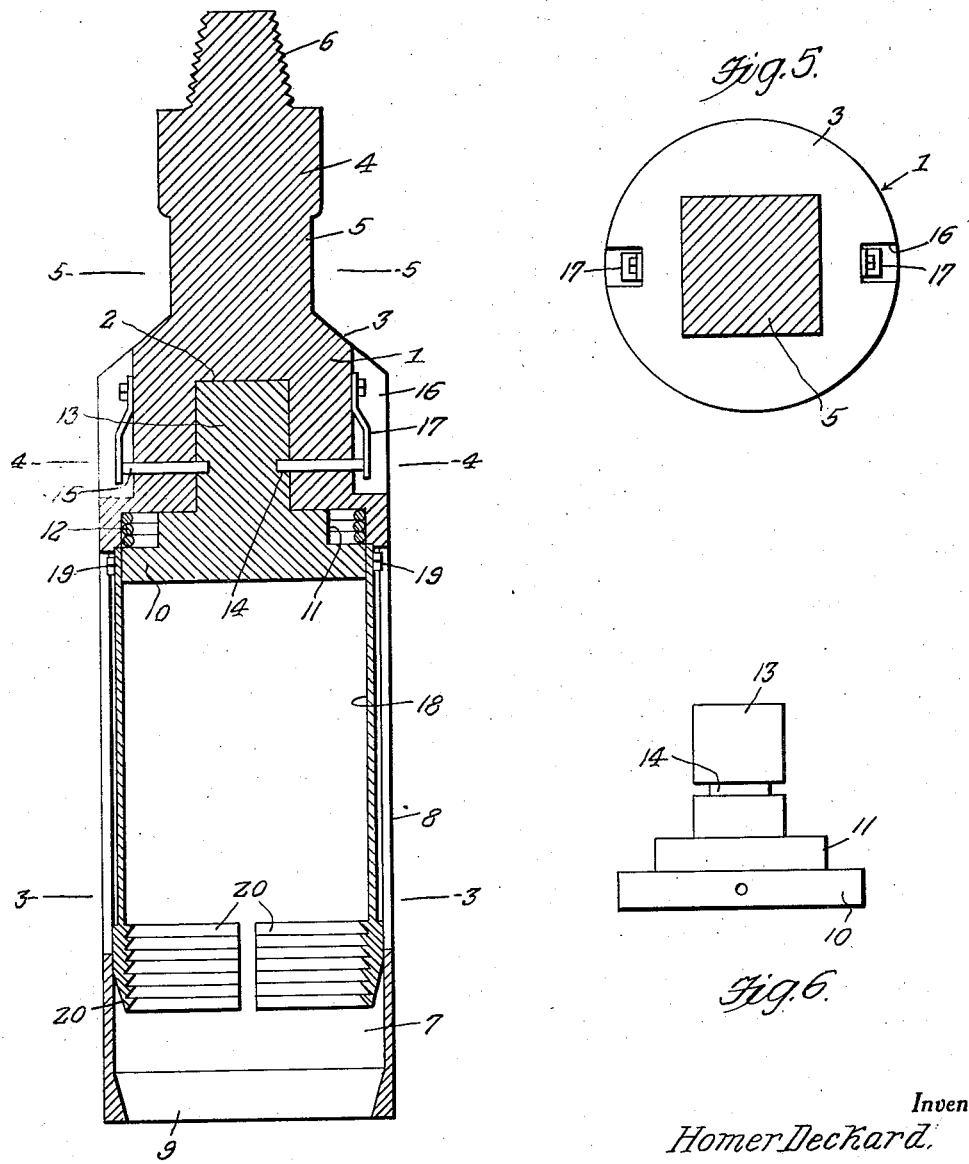
Inventor
Homer Deckard.
By Clarence A. O'Brien
and Hyman Berman
Attorneys Patented Aug. 13, 1940

2,210,902

UNITED STATES PATENT OFFICE 2,210,902

FISHING TOOL

Homer Deckard, Robinson, Ill., assignor of one-half to Claude L. Farnsworth, Robinson, Ill.

Application June 28, 1938, Serial No. 216,385

1 Claim. (Cl. 294—102)

The present invention relates to new and useful improvements in fishing tools for recovering lost objects in oil and other deep wells and has for its primary object to provide, in a manner as hereinafter set forth, a device of this character embodying means whereby said device may be expeditiously disconnected from the lost object when desired such, for example, as when the object is stuck in the hole so tightly that it cannot be jarred loose.

Another very important object of the invention is to provide, in a fishing tool of the type including a plurality of slidable slips for gripping the lost object, novel means for securing said slips in retracted or inoperative position when desired.

Other objects of the invention are to provide a fishing tool of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a fishing tool constructed in accordance with the present invention.

Figure 2 is a view in vertical section through the device, taken substantially on the line 2—2 of Fig. 1.

Figure 3 is a view in horizontal section, taken substantially on the line 3—3 of Fig. 2.

Figure 4 is a horizontal sectional view, taken substantially on the line 4—4 of Fig. 2.

Figure 5 is a view in horizontal section, taken substantially on the line 5—5 of Fig. 2.

Figure 6 is a detail view in elevation of the slidable member.

Referring now to the drawings in detail, it will be seen that the embodiment of the invention which has been illustrated comprises a body 1 of suitable metal having formed in the lower portion thereof a vertical cylinder 2. The body 1 has formed thereon an inclined shoulder 3 from which an integral shank 4 rises. The shank 4 includes a square lower portion 5 for receiving a wrench. On the upper end of the shank 4 is the tapered, threaded male member 6 of the usual rod joint.

Depending from the lower end of the body 1 is an integral socket 7 having vertical slots 8 in diametrically opposite sides thereof. Formed in the lower end portion of the socket 7 is an annular cam 9.

Mounted for vertical movement in the socket 7 is a metallic disk 10. The disk 10 comprises a reduced upper portion 11 providing an annular chamber in the upper portion of the socket 7 which accommodates a coil spring 12. Rising from the upper portion 11 of the disk 10 is an integral piston 13 which is slidably engaged in the cylinder 2. The piston 13 has formed therein at an intermediate point a circumferential groove 14 for the reception of pins 15 which are slidably mounted in the lower portion of the body 1. Vertical channels 16 are provided in the body 1 and mounted therein are springs 17, said springs being engaged with the pins 15 in a manner to yieldingly urge said pins inwardly.

The reference numeral 18 designates a pair of arms which depend from the disk 10. The arms 18 are secured to the disk 10 through the medium of suitable element 19. Segmental slips 20 are provided on the lower ends of the arms 18. It will be noted that the slips 20 are substantially semicircular and it will also be observed that said slips are internally toothed for firmly gripping the lost object in the well. Further, the slips 20 are provided with externally bevelled lower portions 21 which are engageable with the annular cam 9.

It is thought that the operation of the device will be readily apparent from a consideration of the foregoing. When the tool is lowered into the well the pins 15 are disengaged from the groove 14 and bear against the upper portion of the piston 13, the disk 10 with the slips 20 thereon being in lowered position. Coil spring 12 yieldingly urges the disk 10 downwardly in the socket 7. Of course, the object to be recovered enters the socket 7 and, when the device is lifted, said object is firmly gripped between the slips 20 which are closed on said object by the cam 9. Now, should it be desired to release the lost object for any reason this may be expeditiously accomplished by utilizing the weight of the fishing stem to force the body 1 and the socket 7 downwardly. When this is done the slips 20 release the lost object, the disk 10 is engaged with said object in a manner to be raised thereby and the springs 17 engage the pins 15 in the groove 14 of the piston 13 for securing said slips in inoperative position, as shown to advantage in Fig. 2 of the drawings. The slots 8 facilitate the assembling of the slips 20 on the disk 10 in the socket 7.

It is believed that the many advantages of a fishing tool constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A fishing tool including a metallic body having a vertical cylinder in its lower portion, a socket member depending from said body, a disk mounted for reciprocation in the socket member, gripping members depending from said disk, the disk including a reduced upper portion engageable directly with the lower end of the body and providing an annular chamber in the socket member, a coiled spring mounted in the annular chamber and engaged with the disk for yieldingly urging said disk downwardly in the socket member, and a piston rising from the reduced portion of the disk and operable in the cylinder.

HOMER DECKARD.